United States Patent [19]
Cui et al.

[11] Patent Number: 6,111,910
[45] Date of Patent: Aug. 29, 2000

[54] MAXIMAL CORRELATION SYMBOL ESTIMATION DEMODULATOR

[75] Inventors: Jian Cui; Derek Stephen Hilborn, both of Nepean, Canada

[73] Assignee: Nortel Networks Corporation, Montreal, Canada

[21] Appl. No.: 08/989,265

[22] Filed: Dec. 11, 1997

[51] Int. Cl.[7] ............................. H04L 27/14; H04J 13/04
[52] U.S. Cl. .................. 375/142; 375/150; 375/343; 375/346
[58] Field of Search .................................. 375/142, 143, 375/150, 152, 324, 340, 343, 346, 347; 455/205

[56] References Cited

U.S. PATENT DOCUMENTS

| | | | |
|---|---|---|---|
| 5,602,833 | 2/1997 | Zehavi | 375/209 |
| 5,946,345 | 8/1999 | Zehavi | 375/210 |

OTHER PUBLICATIONS

Harry Lieb, Data–Aided Noncoherent Demodulation of DPSK, Apr. 1995, pp. 722–755, IEE Transactions on Communications, vol. 43, No. 2/3/4.

*Primary Examiner*—Amanda T. Le

[57] ABSTRACT

A maximal correlation symbol estimation (MCSE) method for estimating the symbols that are modulating an information signal component of a received signal, which can be applied to received signals that additionally contain an interference signal component, is disclosed. The method is achieved by correlating the received signal with all possible reference signals, each reference signal being one of a closed set of all possible information signals recognized by the given digital modulation scheme, and selecting as an estimate of the information signal the reference signal whose correlation with the received signal most closely resembles a weighted average of correlations between previously estimated information signals and their corresponding received signals. Demodulators that implement this method are adapted to perform many functions, including the estimation of symbols modulating frequency modulated (FM) received signals prior to the signals being FM demodulated. The embodiment of the MCSE demodulator adapted to carry out this last function, is designed to reduce inter-symbol interference caused by filter responses in the transmitter and receiver, and to permit each symbol to modulate a non-integer average number of signal samples.

20 Claims, 11 Drawing Sheets

X denotes a time at which a sample is taken

TABLE    Relative Phase of Samples Using 48600 Sample Rate

| Symbol Number | Phase of Samples in 243rds of a Symbol Time | Number of Samples in Symbol |
|---|---|---|
| 0 | 00 50 100 150 200 | 5 |
| 1 | 07 57 107 157 207 | 5 |
| 2 | 14 64 114 164 214 | 5 |
| 3 | 21 71 121 171 221 | 5 |
| 4 | 28 78 128 178 228 | 5 |
| 5 | 35 85 135 185 235 | 5 |
| 6 | 42 92 142 192 242 | 5 |
| 7 | 49 99 149 199 --- | 4 |
| 8 | 06 56 106 156 206 | 5 |
| ... | ... | ... |
| N | Rem(N*7,50):50:243[a] | [Rem(N*7,50)<43]+4[a] |

[a] MATLAB style equation where rem is the remainder function.

MAXIMAL CORRELATION SYMBOL ESTIMATION DEMODULATOR

FIELD OF THE INVENTION

This invention relates to wireless communications, and more specifically, an improved demodulator for mitigating channel impairments.

BACKGROUND OF THE INVENTION

In cellular communications systems, a demodulator is used at a receiver to extract data symbols such as 1-bits and 0-bits that are modulating a communications signal.

The function of a demodulator is complicated by the addition of additive white Gaussian noise (AWGN) and co-channel interference (CCI) to the information signal as it is transmitted through the flat-fading mobile-radio environment. AWGN is introduced because of long-term fading effects, which attenuate the strength of a signal as the distance it travels increases, and short-term fading effects, which are caused by time dispersive media and local reflections. CCI is introduced when several communication channels in geographically close proximity to one another, using the same or closely spaced frequencies, begin to interfere with each other. It is a goal of the art to design cost-effective and rapid demodulators that extract modulating symbols from communications signals, notwithstanding the addition of noise and interference to the signals as they travel through the mobile radio environment.

The nature of the problem can be elucidated if the communications signal arriving at the input of a demodulator is analysed. More specifically, if one considers chopping up the signal along its time-axis into a plurality of segments that each correspond to one or a small number of symbols, such a segment, hereinafter the received signal, can be expressed in the following form:

$$r(n)=s(n)+\alpha v(n)$$

The variable "n" is an index used to delineate the different received signals that comprise the communications signal received from the transmitter. "s(n)", hereinafter the information signal, is the part of the received signal that was modulated by one or more data symbols at the transmitter. Once the demodulator has determined the information signal, it can easily demodulate symbols from it. "α" is a fading coefficient used to model the Doppler effect and is normally assumed to have a constant value over short-periods of time, the duration of the periods being a function of the mobile speed. "v(n)" is the part of the received signal caused by the combined effects of AWGN and CCI, hereinafter the interference signal. The problem can thus be described as isolating the information signal from within the received signal, given that both the information signal and the interference signal are unknown.

The solution to the problem is made easier because, assuming a digital modulation scheme is in use, a demodulator always has partial knowledge of the information signal. This knowledge is that the information signal can only be one of $x^N$ possible signals, where x is the number of symbols modulating each information signal, and N is the number of symbols supported by the modulation scheme in use. For example, if a π/4-DQPSK modulation scheme is in use, the information signal carrying a single symbol would have the following form:

$$s(n)=s(n-1)e^{jnB/4},$$

where B=1,3,5 or 7

In this example, the information signal would have to be one of only four possible signals.

This narrowing of the solution set for the information signal, is important because it allows demodulators to take advantage of cross-correlation detection techniques. These techniques are centered around a method of detecting signals in which the received signal is compared, point to point, with a reference signal that is an estimate of what the received signal should be if modulated by a given symbol. The output of such a detector is a measure of the degree of similarity between the received signal and the reference signal. Demodulators can take advantage of these techniques, by setting the reference signals of a cross-correlation detector to equal each of the $x^N$ possible information signals that could be within the received signal, and then selecting the reference signal that most closely correlates with the received signal as an estimate of the information signal.

More work must be done however, before relying on such cross-correlation detection techniques to correctly identify information signals within received signals. This is because differences between a reference signal and a received signal could be just as easily attributable to the effects of CCI and AWGN, as to differences between the underlying modulating symbols of the signals. Two signals that seem well-correlated may in fact only seem that way due to CCI and/or AWGN effects. Likewise, two signals that are in fact modulated by the same symbol may be poorly correlated with each other due to CCI and/or AWGN effects.

Therefore, in order to function in an environment that is heavily affected by CCI and/or AWGN, it is desirable that demodulators that use cross-correlation detection techniques, hereinafter referred to as correlation demodulators, be able to distinguish between differences between received and reference signals that are attributable to CCI and/or AWGN, and those that are attributable to their differing underlying modulating symbols. Conventional correlation demodulators, which simply cross-correlate each received signal with all possible reference signals, are unable to make this distinction, and thus select many incorrect reference signals as estimates of information signals when operating in the mobile radio environment.

Some existing correlation demodulators do try to model the effects of AWGN and CCI by making use of history correlation data. History correlation data is a record of the received signals and information signal estimates that have been previously made by the demodulator. Such demodulators however, are not generally applicable to all digitally modulated signals, these signals being any digital signal that has been modulated using a scheme that recognizes a finite number of symbols. For example, an article entitled "Data-aided Non-coherent Demodulation of DPSK" in IEEE Transactions On Communications, Vol. 43, No. 2/3/4, February/March/April 1995, describes a demodulator that makes use of history correlation data, but only to take into account a random phase shift introduced by the channel. The information this demodulator derives from the history correlation data is only applicable to signals conforming with differential phase shift modulation schemes, and using a one-symbol-per-received-signal format.

A correlation demodulator is thus needed that can make use of history correlation data to more accurately demodulate received signals conforming with any digital modulation scheme.

Such demodulators could be deployed in a wide variety of applications. One such application is in the field of frequency modulated (FM) receivers. Conventional FM receivers perform frequency demodulation before attempting correlation detection on the resulting frequency demodulated signals. This is undesirable because much of the amplitude information in the received signal that is lost during frequency demodulation is useful in performing correlation detection. Furthermore, a long delay is imposed on the receiver as a received signal must proceed through a frequency demodulation as well as a correlation detection process before yielding symbols.

FM transmitters conforming with the Advanced Mobile Phone Service (AMPS) wideband data protocol, frequency modulate streams of bits at a rate of 10 kbps, which each must be over-sampled in light of the wide bandwidth associated with each FM signal. However, the AMPS signal is commonly sampled at 48,600 samples per second in order to conform with the more widely used TDMA protocol. This non-integer over-sampling of the AMPS signals (i.e. 4.86 samples per symbol) is the cause of additional processing requirements at the receiver to interpolate the signal to an integer over-sample ratio.

FM receivers are plagued by inter-symbol interference caused by filter responses in the transmitter and the receiver. These responses will persistently manifest themselves as the overlapping of one received signal into temporally adjacent received signals. It is desired that such responses be factored into the operation of demodulators deployed in FM receivers.

SUMMARY OF THE INVENTION

It thus is an object of this invention to design a broadly applicable demodulator that can use history correlation data to extract modulating symbols from received signals. It also is an object of this invention to apply such a demodulator to a variety of new applications, including FM receivers.

This invention achieves the former object using, in a digital signal processor that takes as input a series of received signals, each received signal composed of firstly an information signal that is modulated according to a given digital modulation scheme by at least one symbol, and secondly an interference signal, a method of estimating the information signal by correlating the received signal with all possible reference signals, each reference signal being one of a closed set of all possible information signals recognized by the given digital modulation scheme, and selecting as an estimate of the information signal the reference signal whose correlation with the received signal most closely resembles a weighted average of correlations between previously estimated information signals and their corresponding received signals.

The resulting processor, referred to as a Maximal Correlation Symbol Estimation (MCSE) demodulator, takes as input a series of received signals, and comprises in a preferred embodiment: a history data correlator for generating a history data correlation, a history data correlation being a weighted average of a plurality of correlations, and each correlation being between a previously received signal and a previously made estimate of the information signal lying within the previously received signal; a reference correlator for generating, firstly candidate correlations between the present received signal and all possible reference signals, each reference signal being one of the closed set of all possible information signals recognized by the given digital modulation scheme, and secondly decision variables that each equal the correlation between a candidate correlation and the history data correlation; and a decision device for selecting as the estimate of the information signal, the reference signal used to generate the largest of the decision variables.

One of a plurality of inventive applications of the MCSE demodulator is a new frequency modulated (FM) signal receiver that is another aspect of this invention. The receiver makes use of the MCSE demodulator to extract symbols from received signals, that have not yet been frequency demodulated. That is, it performs correlation detection on FM signals without measuring the angle of those signals. This is done because the FM demodulation process removes information from received signals that are vital to the successful completion of the correlation detection process. Performing correlation detection on FM signals is also done to speed up the process of converting received FM signals into a useful stream of symbols.

This latter aspect of the invention is implemented in a frequency modulated (FM) signal receiver, comprising a timing recovery unit (TRU), a correlation demodulator that outputs symbols used to modulate the FM radio-wave, and at least one branch of components that feeds the TRU and the correlation demodulator, each branch being comprised of an antenna for detecting FM radio-waves, connected to a radio-frequency (R/F) front end, connected to an automatic gain controller (AGC), connected to an analogue-to-digital (A/D) converter, connected to a receive (Rx) filter.

The MCSE demodulator requires only slight modifications for this application. It is modified to take as input a series of samples of received signals, rather than a series of received signals, to conform with FM modulation schemes.

The MCSE demodulator is also adjusted to demodulate received signals that are over-sampled using a non-integer number of samples per signal, in order to allow the receiver to make better use of the channel capacities allocated to them. Finally, the MCSE demodulator is also modified to mitigate the effects of inter-symbol interference by expanding the number of samples it recognizes so as to incorporate the effects of such interference into the reference signals.

BRIEF DESCRIPTION OF THE DRAWINGS

Embodiments of the invention will now be disclosed with reference to the accompanying drawings, in which.

DETAILED DESCRIPTION OF THE PREFERRED EMBODIMENTS

Figure 1:
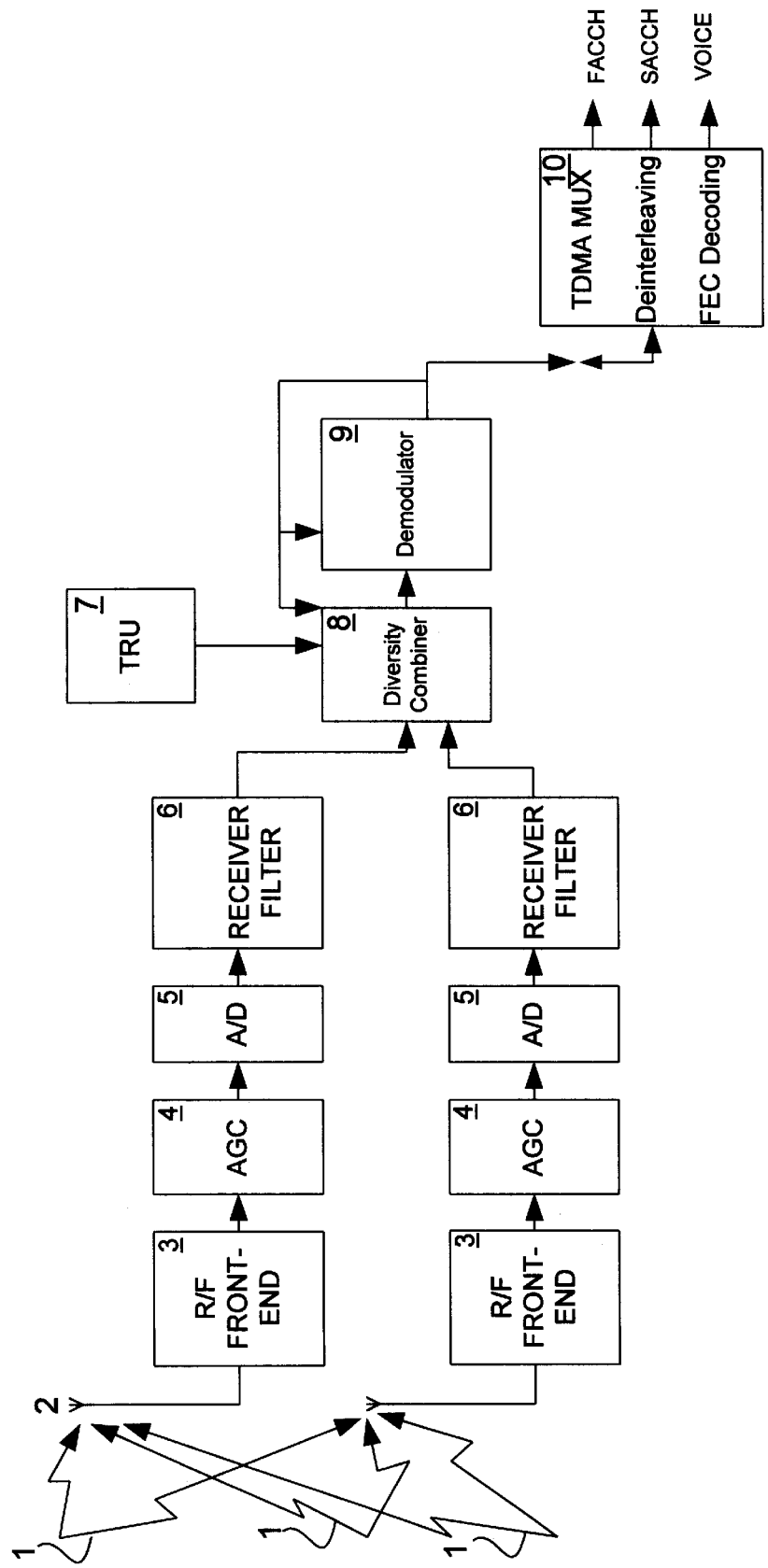
FIG. 1 is a high-level block-diagram of a conventional time division multiple access (TDMA) receiver.

FIG. 1 illustrates a simplified block diagram of a wireless communications receiver for receiving time-division multiple access (TDMA) radio waves 1. If located on a basestation, the receiver uses a diversity scheme that has two branches, primarily for the reduction of additive white Gaussian noise (AWGN). It is to be noted that mobile units, and some receivers, employ single-branch non-diversity receivers. Each branch has an antenna 2 that is separated physically from the other antenna by a small distance, and/or tuned to receive signals at a slightly different frequency from the other branch. The antenna leads into the following sequence of standard circuit-blocks—a radio-frequency (RF) front-end 3, connected to an automatic gain controller (AGC) 4, connected to an analog to digital (AD) converter 5, connected to a receive filter 6. The combined effect of these blocks, and a timing recovery unit (TRU) module 7, is to generate a pair of incoherently matched digital received signals that are ready to be combined and demodulated. A combiner 8 takes these signals as input and generates as output a series of diversity-combined signals that would still be corrupted by some AWGN effects and CCI effects if sent through a mobile radio environment. The output is sent to a correlation demodulator 9, which outputs a stream of symbols. The resultant symbol stream is passed to a TDMA demultiplexor 10 which subdivides the stream for delivery to end-users.

If one chops up the signal at the input of the demodulator 9 along its time-axis, into a plurality of segments that are each modulated by one or a small number of symbols, such a segment, hereinafter the received signal, can be expressed in the following form:

$$r(n)=s(n)+\alpha v(n)$$

The variable "n" is an index used to delineate the different received signals that comprise the signal at the input of the demodulator 9. "s(n)", the information signal, is the part of the received signal that has been modulated by one, or a small integer number of, symbols. "$\alpha$" is a fading coefficient used to model the Doppler effect and is normally assumed to have a constant value over short-periods of time, the duration being a function of the mobile speed. "v(n)", hereinafter the interference signal, is the part of the received signal caused by the combined effects of AWGN and CCI that have not yet been removed by other parts of the receiver.

The most important intermediate output of a demodulator is the decision signal. It is an estimate made by the demodulator 9 of the information signal that is within a received signal. Assuming the received signal is a digitally modulated signal, such a digital signal being modulated by a scheme that recognizes a finite number of symbols, the demodulator always has partial knowledge of the information signal.

Figure 2:
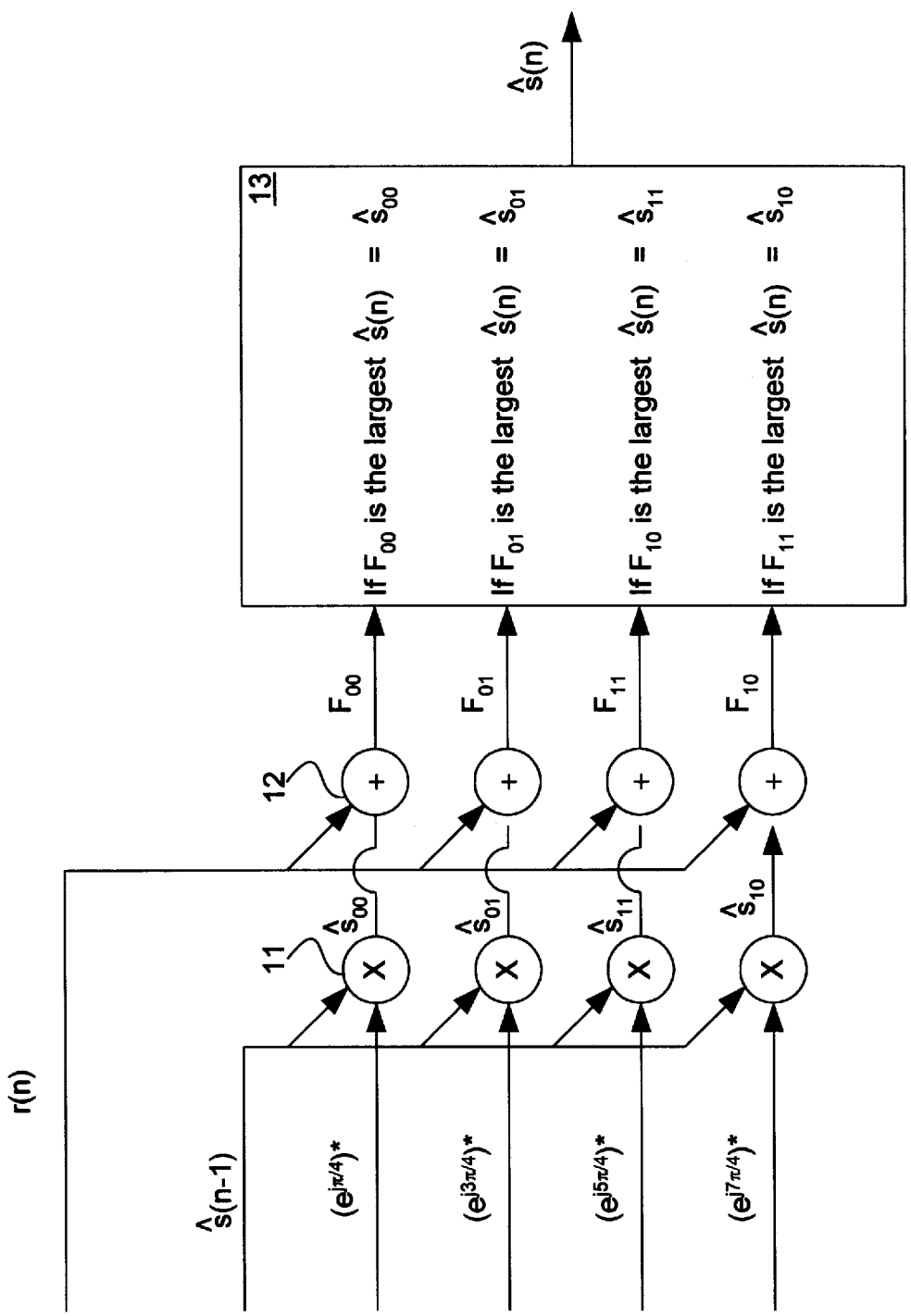
FIG. 2 illustrates a conventional demodulator for use in the receiver of FIG. 1.

Conventional demodulators use this partial knowledge in conjunction with correlation detection techniques, to extract information signals from received signals. FIG. 2 is conceptual illustration of a correlation demodulator that is of conventional design, and that demodulates signals conforming with the $\pi/4$-DQPSK modulation scheme. The demodulator 9 is comprised of a battery of multipliers 11 connected to a battery of adders 12 connected to a decision device 13. The demodulator 9 generates the four possible reference signals under this modulation scheme, by multiplying the decision signal associated with the previous received signal, $\hat{s}(n-1)$, with the four possible phase shifting signals supported by the $\pi/4$-DQPSK scheme, using the battery of multipliers 11. Since the magnitude of the four resulting reference signals, $\hat{s}_{00}$, $\hat{s}_{01}$, $\hat{s}_{11}$, $\hat{s}_{10}$, will be equal to one another, correlation with the received signal can be achieved by simply adding each reference signal to the received signal. This is accomplished by the battery of adders 12. The adders 12 yield four decision variables as output, $F_{00}$, $F_{01}$, $F_{11}$, and $F_{10}$. The largest decision variable, which is selected by the decision device 13, will be associated with the reference signal that correlates most closely with the received signal. That reference signal will be deemed the decision signal for the present iteration, $\hat{s}(n)$, and can be easily decoded to yield symbols.

The problem with the demodulator 9 of FIG. 2 is that it does not attempt to discover to what extent correlations between reference signals and the received signal are being determined by the interference signal component of the received signal. This information is vital since correlations that are significantly based on interference signal components are poor indicators of what information signal lies within a received signal.

Figure 3:
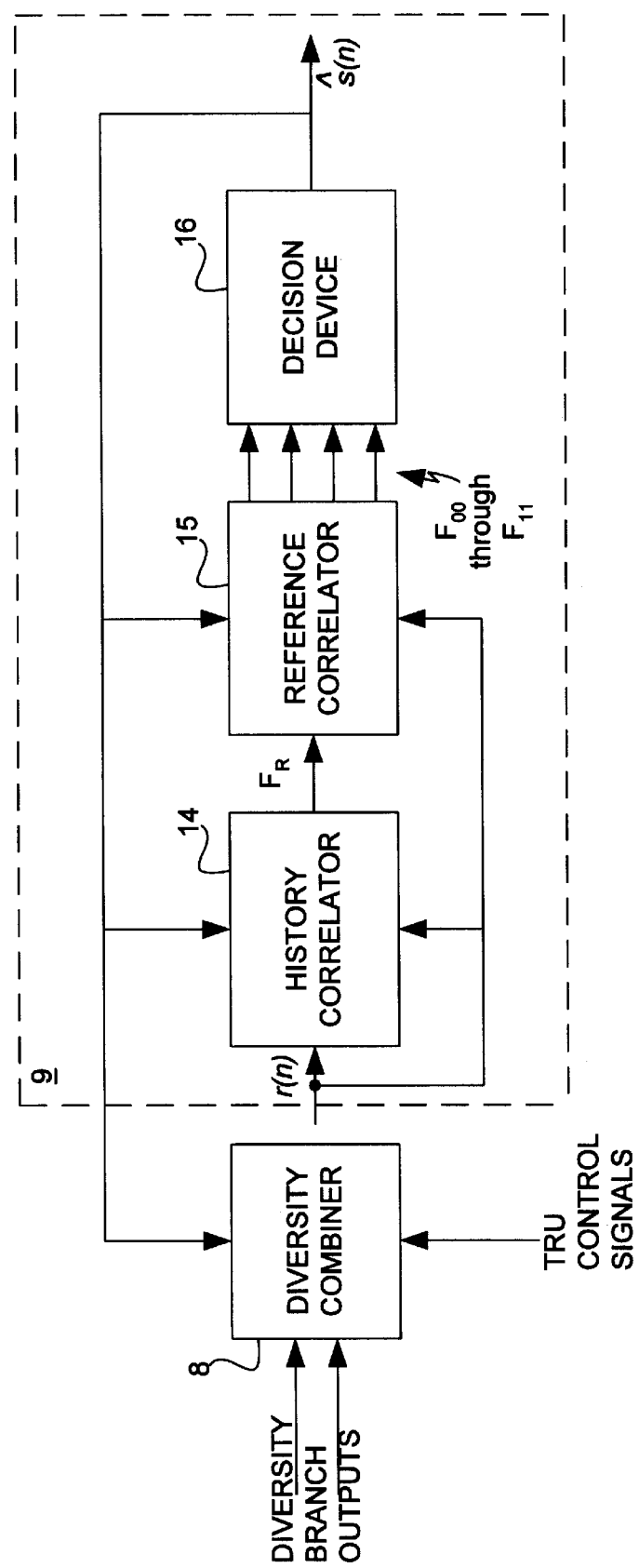
FIG. 3 illustrates a maximal correlation symbol estimation (MCSE) demodulator for use in the receiver of FIG. 1.

FIG. 3 illustrates an overview of a maximal correlation symbol estimation (MCSE) demodulator according to this invention, for replacing in FIG. 1, the demodulator 9 illustrated in FIG. 2. This demodulator estimates the relative effects of the information and the interference signals on the correlations it makes between the received and reference signals. Inside the MCSE demodulator is a history data correlator 14, which receives from the diversity combiner 8, the received signal as an input. The history data correlator 14, which also takes as input the decision signal associated with the previous received signal, outputs a history data correlation, $F_R$. This correlation is passed to the input of a reference correlator 15. The outputs of the reference correlator 15, which are decision variables $F_{00}$, $F_{00}$, $F_{10}$, and $F_{11}$, are sent to a decision device 16. The output of the decision device 16, is the decision signal, $\hat{s}(n)$. It is fed back into the reference correlator 15, the history data correlator 14 and the diversity combiner 8. The decision signal can be easily decoded to yield symbols.

Whereas the conventional demodulator of FIG. 1 selected a decision signal by determining which reference signal correlates most closely with the received signal, the demodulator of FIG. 3 selects a decision signal by determining which correlation between the reference signals and the present received signal, correlates most closely with correlations between previous received signals and their corresponding decision signals.

Figure 4:
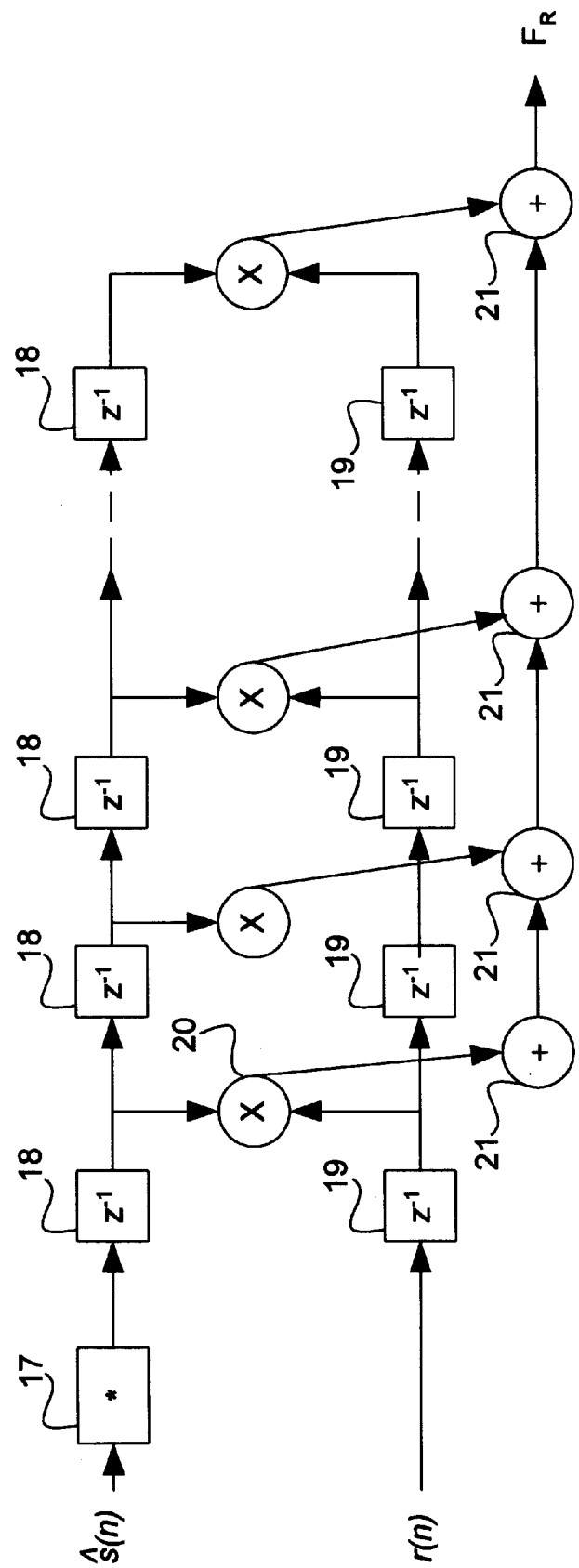
FIG. 4 illustrates a history data correlator, that is part of the MCSE demodulator of FIG. 3.

Correlations between previous received signals and their corresponding decision signals are generated by the history data correlator 14, which is illustrated in FIG. 4. The history data correlator 14 takes as input the decision signals from the previous iterations. The conjugate of each previous decision signal is taken by a conjugator 17. The resulting signal is then fed into a tapped delay line implemented by a series of K delay blocks 18. A second tapped delay line 19 identical in structure to the first similarly takes in previous received signals. Both lines 18,19 are operated as first-in, first-out (FIFO) queues, taking in the most recently processed signal at the front of the line, and removing the oldest signals at the end of the line. They thus implement a sliding window of previous received signals and decision signals. The signals stored in the delay lines 18,19 are advanced one node forward every time a new pair of signals arrive. Once all the entries have advanced forward one node, each decision signal is correlated with its corresponding received signal using one of a battery of multipliers 20. The resulting correlations are summed, using a series of adders 21, to form $F_R$, which represents, on average, what a correlation between a received signal and its corresponding information signal should look like, given the presence of CCI and AWGN. It will be appreciated by those skilled in the art that $F_R$ is a weighted average of previous correlations, and that the weights used to generate it may be varied to implement, for example, an exponential window.

Figure 5:
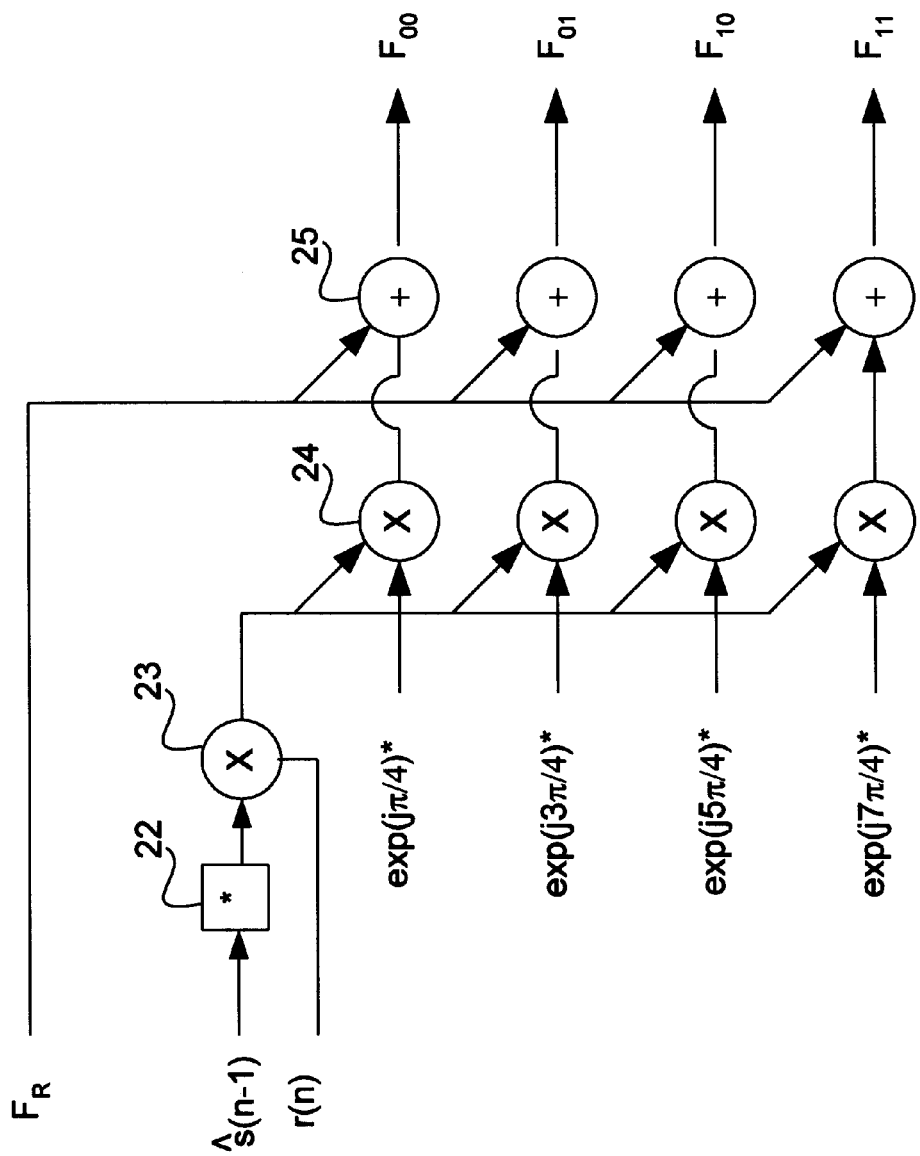
FIG. 5 illustrates a reference correlator, that is part of the MCSE demodulator of FIG. 3.

Correlations between the reference signals and the present received signal, and then with the output of the history data correlator 14, are generated by the reference correlator 15, which is illustrated in FIG. 5. The previous decision signal, ŝ(n−1), is sent into a conjugator 22, whose output is sent into a a multiplier 23 along with the received signal. The result of this multiplication is then branched into a bank of four separate multipliers 24, wherein each branch is multiplied by signals that effect one of the four possible modulation phase increments recognized by the π/4-DQPSK modulation scheme. This results in four correlations, hereinafter candidate correlations, between each of the reference signals and the received signal, r(n). Using the bank of adders 25, each candidate correlation is then added to the history data correlation generated by the history data correlator 15. Each addition correlates one candidate correlation with the history data correlation. These additions thus yield four decision variables, $F_{00}$, $F_{01}$, $F_{10}$, $F_{11}$, that are passed to the decision device 16.

Figure 6:
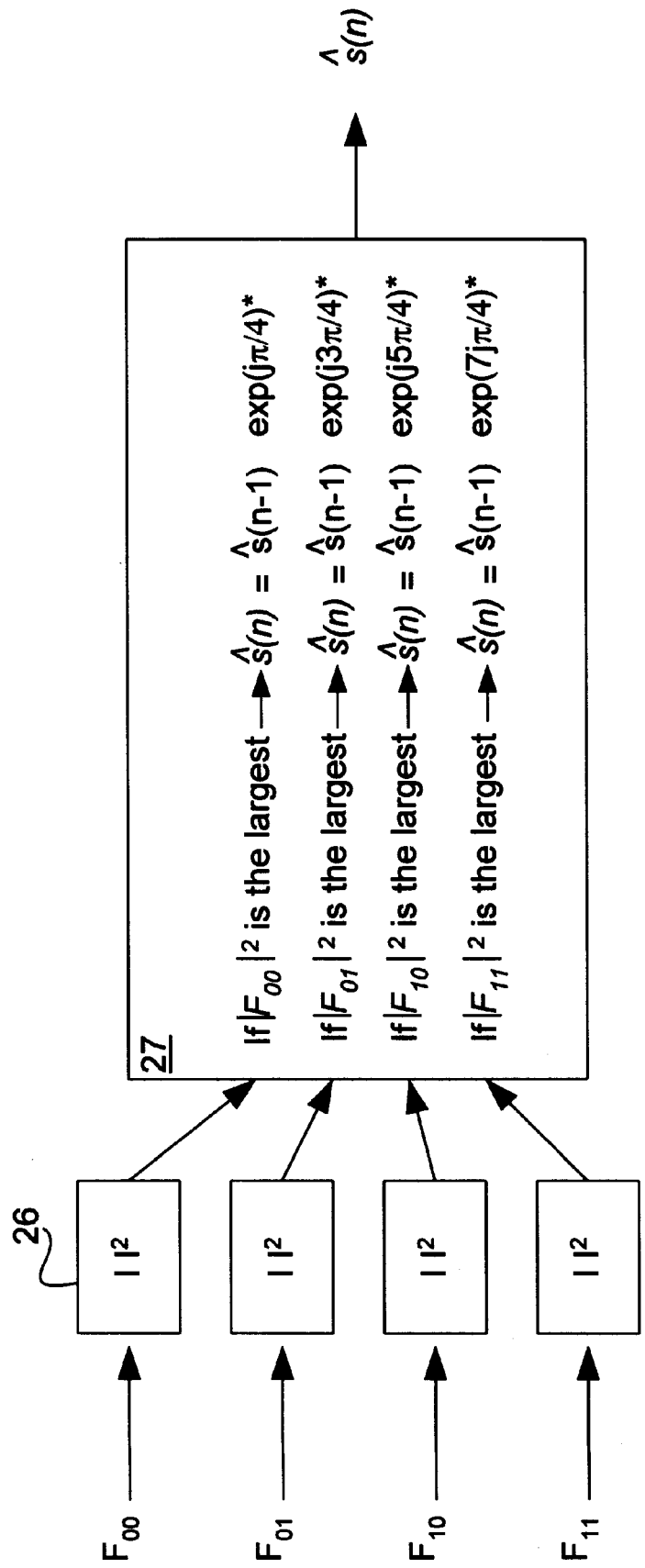
FIG. 6 illustrates a decision device, that is part of the MCSE demodulator of FIG. 3.

The decision device 16, illustrated in FIG. 6, selects a decision signal from amongst the four reference signals. It has a bank of blocks 26 that take the square of the magnitude of each decision variable. The squared decision variables are then passed to a maximum selector 27 that selects the largest of the squared values. The maximum selector 27 deems the reference signal associated with the largest decision variable, to be the decision signal, ŝ(n). The decision signal can thereafter be easily decoded to provide a stream of symbols as output, or fed back to the diversity combiner 8 and the correlation blocks 14, 15 for use in estimating information signals for future received signals.

It will be appreciated by those skilled in the art, that the method used by the MCSE demodulator helps remedy the aforementioned problems with the conventional demodulator of FIG. 2. It also will be appreciated that the MCSE demodulator is superior to the methods employed by other demodulators that also use history correlations, for several reasons.

Firstly, the MCSE demodulator is generally applicable to any digitally modulated signal, while other demodulators that use history data correlations are each only applicable to narrow families of modulation schemes. For example, the demodulator described in the aforementioned article, "Data-aided non-coherent demodulation of DQPSK", of IEEE Transactions on Communications Vol. 43, no. 2/3/4, February/March/April 1995, uses the history correlation, for the narrow purpose of helping the demodulator figure out what phase change is introduced as a result of the flat-fading channel with AWGN and CCI effects. It does not use the history data in the same way it is used by this demodulator, which is as a reference correlation that is to be matched by correlations between the present received signal and the reference signals. As a result, while the other demodulator is not applicable to signals that do not use phase shift encoding, the MCSE demodulator is applicable to any signal that is generated using a given digital modulation scheme, once one makes the following modifications to the preferred embodiment of FIGS. 3,4, 5 and 6:

1. changing the reference signals to conform with the information signals that are possible under the given modulation scheme; and,
2. changing the number of outputs emerging from the reference correlator 15, and the number of inputs leading into the decision device 16, to match the number of symbols recognized by the given modulation scheme.

For example, as will be shown below, the MCSE demodulator can demodulate Advanced Mobile Phone Service (AMPS) wideband data protocol signals even though such signals use FM modulation, and even though each AMPS symbol can only be determined after analysing a small integer number of signal samples(as opposed to having to analyse one signal, to determine a π/4 DQPSK symbol).

Another advantage of the MCSE demodulator over other demodulators that use history correlation data, is that it does not need to be initialized using an initial training-sequence of symbols. In a preferred embodiment, the MCSE demodulator is initialized using a training-sequence of K received signals whose modulating symbols are known, in order to generate a seed collection of previous received signals and decision signals for use in generating initial history data correlations. Nonetheless, in the absence of a training-sequence, the MCSE demodulator can be initialized through an exhaustive search over all possible history sequences. The demodulator described in the aforementioned IEEE article has degraded performance when no training-sequence is available.

The MCSE demodulator disclosed herein achieves these advantages using a simple design, and without degrading performance.

This simple and flexible demodulator has several potential applications, aside from being used as an enhanced demodulator in the presence of AWGN and CCI in a flat-fading environment. With minor modifications, it can be used to detect any number of information signals simultaneously, to serve as an equalizer, or to provide an enhanced feedback signal in a conventional equalizer or diversity combiner. Finally, it is applicable to receivers of any digitally modulated signals, and can thus improve a wide variety of communications signal processors.

For example, one application of the MCSE demodulator is to deploy it inside a frequency modulated (FM) receiver to greatly reduce the negative impact of CCI on the reception of FM information signals.

Figure 7:
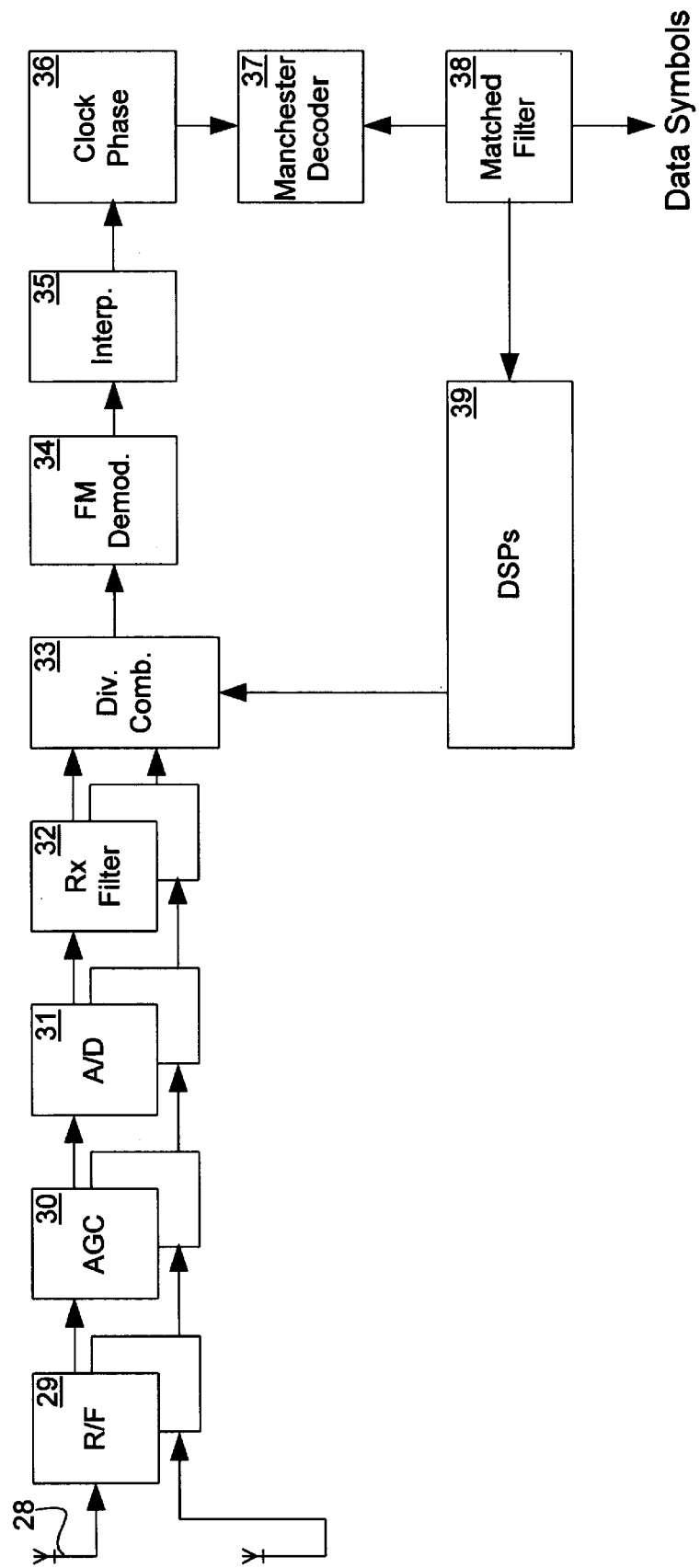
FIG. 7 is a high-level block-diagram of a conventional FM data receiver.

A block diagram of a conventional FM data receiver is illustrated in FIG. 7. It is assumed that the signals processed by the receiver conform with the analog advance mobile phone service (AMPS) wideband data protocol. The receiver uses diversity combining techniques to reduce AWGN. It is to be noted that mobile units, and some receivers, employ single-branch non-diversity receivers. The receiver uses two antennas 28 that are slightly separated in space and/or tuned to receive signals at a slightly different frequency from each other, and that are each connected to a radio-frequency (R/F) front end block 29. The R/F front end block 29 prepares each received wave for combining, at a rate of 48.6 kbps, and down-shifts its frequency from a carrier frequency. As in the receiver of FIG. 1, each R/F front end block 29 feeds into an Automatic Gain Controller (AGC) 30, an analogue-to-digital (A/D) converter 31 and a receive (Rx) filter 32. The Rx filter 32 of each branch feeds both diversity signals into a diversity combiner 33. The diversity combiner 33 uses previous estimations of the information signal (decision signals) to optimally combine the diversity signals so as to reduce AWGN levels. The output of the diversity combiner 33, the received signal for this receiver, is then frequency demodulated at an FM demodulation block 34 using a conventional method wherein the angle of the signal is measured. The resulting baseband signal is interpolated (over-sampled) by an interpolator 35 so that there are an integer number of samples per received signal. The symbol timing is then adjusted using a clock phase alignment block 36. The samples are then Manchester decoded by a Manchester decoder 37 and sent to a matched filter 38 which applies correlation detection techniques to yield symbols as outputs. The symbols are fed back to the diversity combiner 33 after being reset to a format useful to the diversity combiner 33 by a series of digital signal processors 39 (i.e. after the signal is Manchester encoded, clock phase aligned, interpolated and frequency modulated back to the carrier frequency). The feedback signal can be used at the diversity combiner 31 in operations involving further received signals.

One problem with this conventional receiver is that it frequency demodulates the received signal prior to applying cross-correlation detection techniques to it. This is problematic because the former process removes information from received signals that is vital to the successful completion of the latter process.

Another problem is that the conventional receiver requires a long time to process each received signal, because of the numerous digital signal processors a received signal must traverse before being detected. This high complexity, and the accompanying large-processing delay, is undesirable. In diversity combining or equalizer implementations that use this conventional design, where a modulated reference signal is required, additional and costly signal processing is needed to re-modulate the signal.

Figure 8:
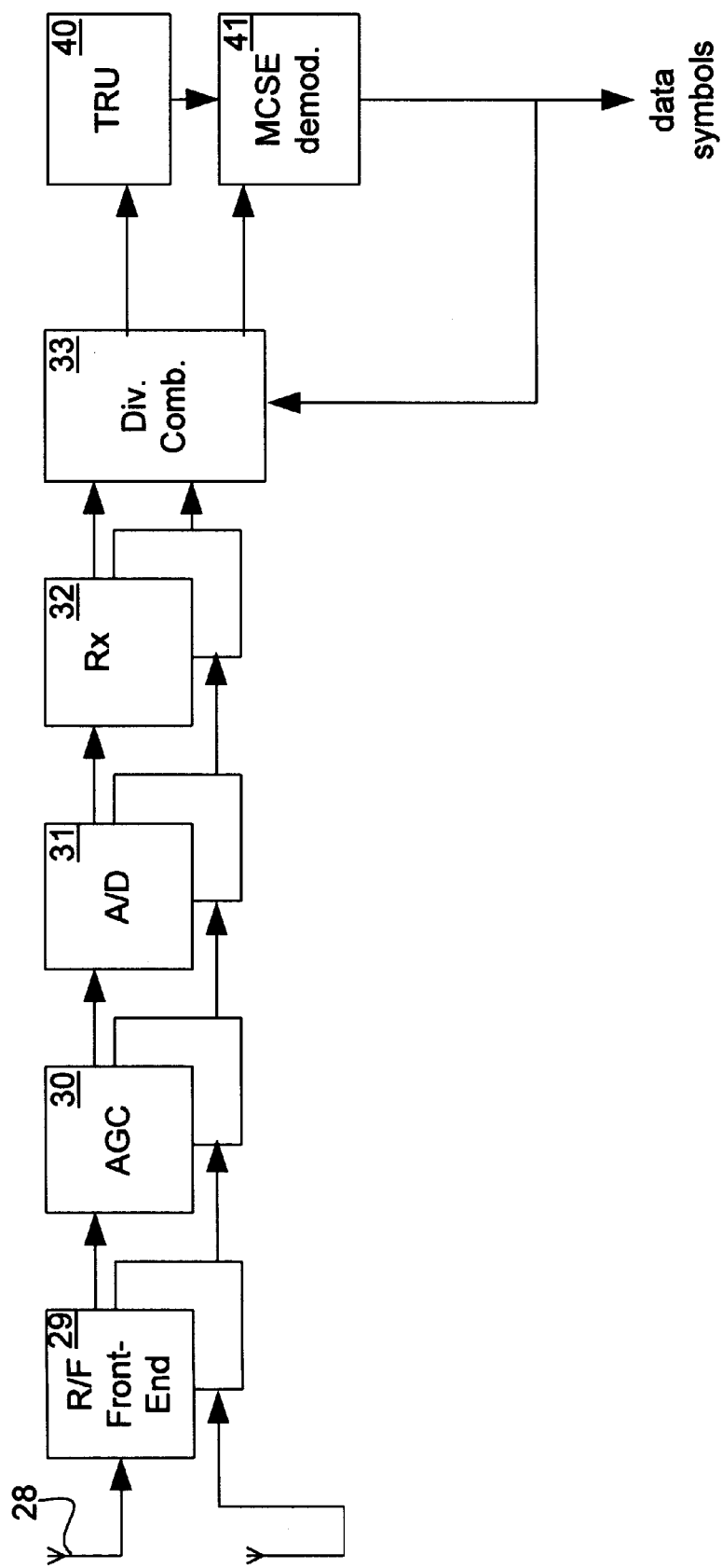
FIG. 8 is a high-level block diagram of an FM receiver that makes use of the MCSE demodulator.

A more accurate, simpler, and lower delay implementation of the FM data receiver that uses the MCSE demodulator is illustrated in FIG. 8. The new receiver is like the conventional receiver of FIG. 7, in that it is comprised of two diversity branches, and in that each branch includes the antenna 28, the RF front end 29, the AGC 30, the A/D converter 31 and the RX filter 32. This new receiver also includes the diversity combiner 33 that, as in the conventional FM receiver, receives the two diversity signals. All the other elements of the receiver of FIG. 7 (34 through 39) are replaced in the receiver of FIG. 8, by a timing recovery unit (TRU) 40 and a correlation demodulator 41, that is preferably an MSCE demodulator like the one described in FIGS. 3 through 6.

In the receiver of FIG. 8, instead of frequency demodulating each signal, interpolating the signal into an integer number of samples per symbol, and then sending the samples through a series of blocks in order to prepare them for the matched filter as is done in the conventional FM data receiver, the FM signal is simply sent directly into the MCSE demodulator 41 which outputs symbols that can also be used to create a reference signal by the diversity combiner 33. The MCSE demodulator 41 uses as reference signals, signals that are still frequency modulated by known symbols in accordance with the AMPS wideband data protocol. That is, the demodulator 41 operates by correlating received signals that have not yet been frequency demodulated. The TRU 40 ensures that the timing of the input into the correlation demodulator 41 is known.

Figure 9:
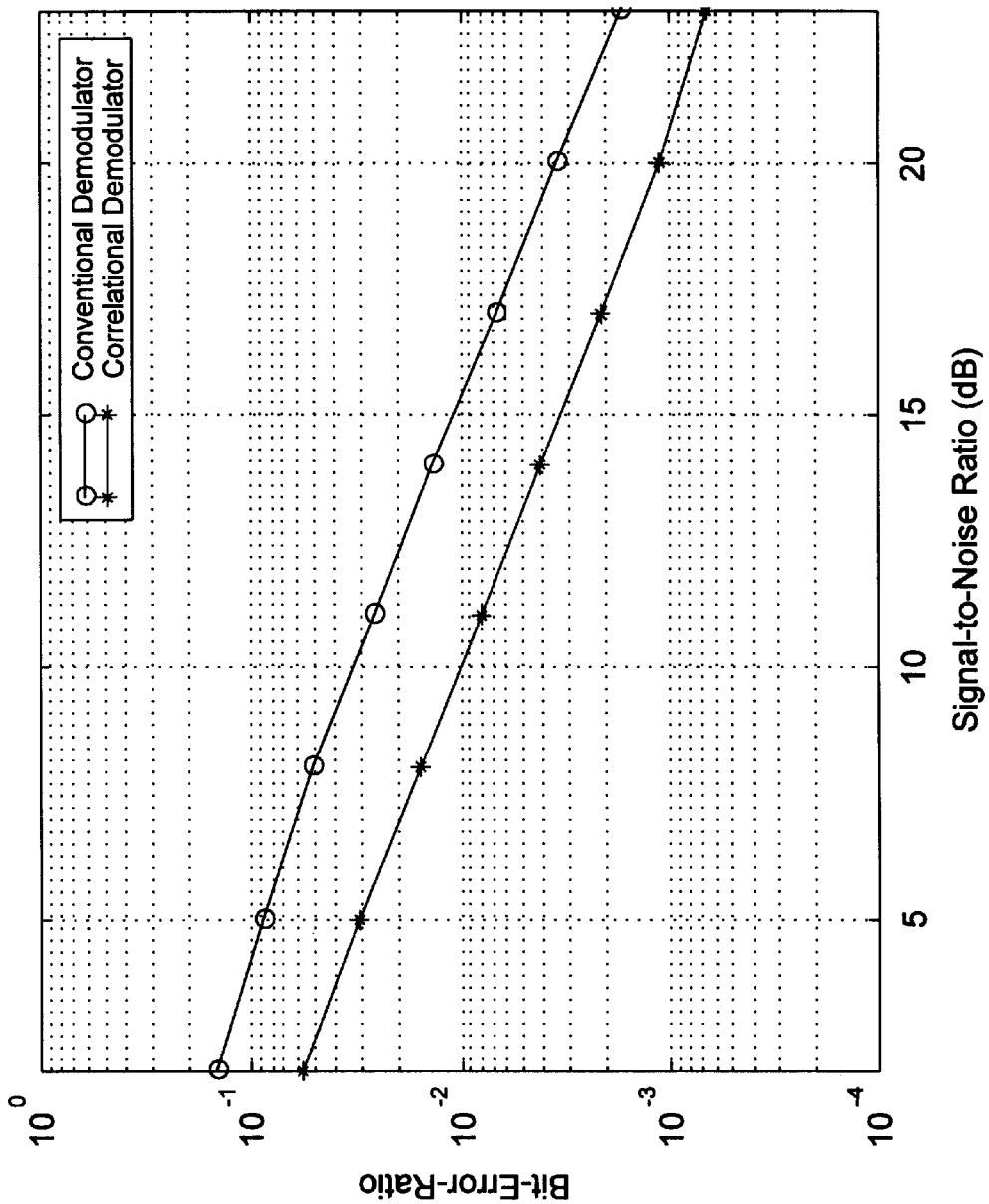
FIG. 9 illustrates plots that compare bit error rate (BER) levels exhibited by non-diversity versions of the receivers of FIG. 7 and FIG. 8.

The receiver of FIG. 8 is superior to the conventional receiver of FIG. 7 because it is simpler and more robust. It also has a smaller delay, which allows it to perform better in feedback systems (i.e. equalizers, diversity combiners). Finally, it delivers an improved BER at a given carrier-to-interference-plus-noise ratio since no frequency demodulation process, which removes valuable information from the signal, precedes the correlation detection taking place within the correlation demodulator 41. This superior performance is illustrated in FIG. 9. FIG. 9 illustrates the bit error rate (BER) recorded at varying levels of interference for non-diversity versions of the conventional receiver of FIG. 7 and the novel receiver of FIG. 8. The plots show the latter to have superior performance.

The FM receiver of FIG. 8 is feasible even if its demodulator 41 is not an MCSE demodulator. That is, the demodulator 41 does not need to advantageously employ history correlation data as is done by the novel MCSE correlator of FIGS. 3, 4, 5 and 6, to exhibit the aforementioned advantages. BER levels are more significantly lowered however, when an MCSE demodulator is used to implement the correlation demodulator 41.

It is to be noted that the above-described novel FM receiver could not use the demodulator described in the aforementioned IEEE article, since the applicability of this other demodulator is limited to phase shift keyed systems.

By contrast, the MCSE demodulator of FIGS. 3,4,5 and 6, can be easily modified for use in the receiver of FIG. 8. The history data correlator 14 does not need to be significantly altered for this application. The most important modification required by the MCSE demodulator of FIGS. 3,4,5 and 6 involves changing the reference signals generated inside the reference correlator 15, to conform with the AMPS modulation scheme. This adjustment to a new modulation scheme also requires feeding into the MCSE demodulator 41 timing signals from the TRU block 40 that can coordinate the transfer of signals using multiple-samples-per-symbol.

Figure 10:
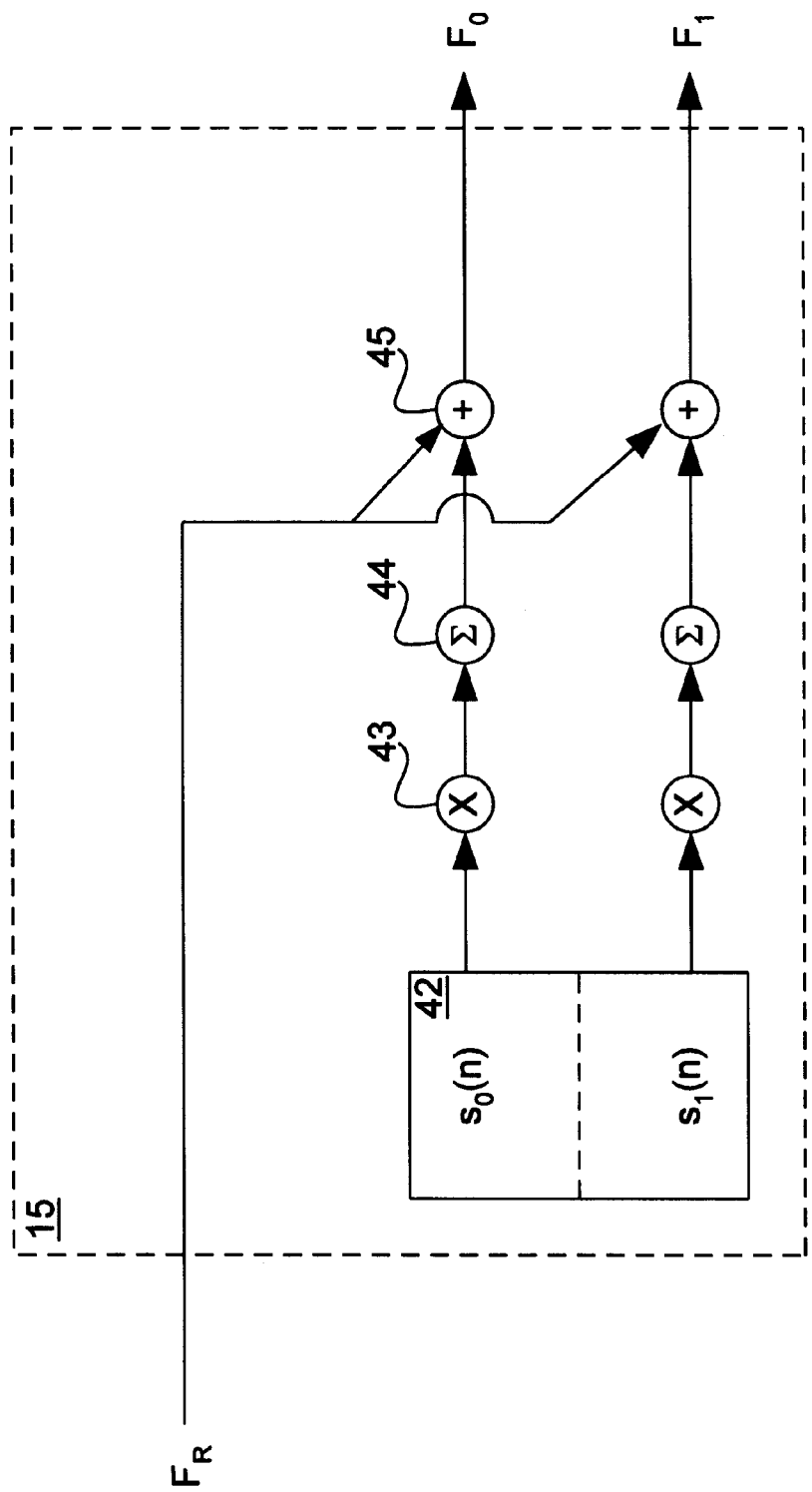
FIG. 10 illustrates a reference correlator used by an embodiment of the MCSE demodulator of FIG. 3, which has been optimized for deployment in the FM data receiver of FIG. 8; and, FIG. 11 illustrates how the phases at which received signals are sampled by the FM data receiver of FIG. 8 are shifted in order to allow for a non-integer average number of samples per received signal.

The former requirement involves changing the modulation scheme that is assumed by the reference correlator 15 of FIG. 5, from the $\pi/4$-DQPSK scheme to the AMPS scheme. This, in turn, requires adjusting the reference correlator 15 to generate sets of samples (each set corresponding to one symbol) of reference signals for correlation, and sets of samples of decision signals for feedback to the history data correlator 14, rather than single samples per symbol. This can be achieved by adopting the modified reference correlator 15 illustrated in FIG. 10. FIG. 10 shows that the modified reference correlator 15 is comprised of a reference modulation look-up table 42, a pair of multipliers 43, a pair of accumulators 44, and a pair of adders 45. It is assumed that clock signals from the TRU 40 coordinate data transfers between these components. The look-up table 42 stores the two information signals recognized by the AMPS protocol, which serve as reference signals in this demodulator. These reference signals would have the following form:

$$s_{symbol}(n)=e^{jCd(n)},$$

where $d(n)$ is a triangle function, and $C=-1$ if symbol=1, and $C=1$ if symbol=0

More precisely, the reference signals are over-sampled by a factor of N over the stored symbol rate on the assumption that the received FM signals coming into the history data correlator 15 would also be over-sampled by a factor of N in order to support the modulated signal bandwidth, as is the normal practice in FM transmissions. In a preferred embodiment, the value of N can be set at roughly 4 or higher- Nortel's TDMA/AMPS system, for example, uses a value of N=4.86. Samples of the reference signal thus feed from the look-up table 42 into the multipliers 43, one sample at a time. The multipliers 43 are used to carry out correlations between the samples of the reference signals and the samples of the received signals that are fed into the MCSE demodulator 41. The correlation sum for one symbol is calculated by summing every $N_{integer}$ samples, $N_{integer}$ being some integer close in value to N, using the accumulators 44. Using the adders 45, the resulting correlations between each reference symbol and the received signal are then added to the history data correlation, which would indicate what a correlation between a sample of a received signal and a sample of a correctly demodulated information signal should look like. The decision variables generated by the reference correlator of FIG. 10 are passed outside the reference correlator 15 to a decision device 16, like the one of FIG. 6. The decision device 16 generates samples of decision signals for use as feedback into a diversity combiner or equalizer, and for decoding into bits. The decision device 16 would be slightly modified with respect to the one illustrated in FIG. 6, to take only two decision variables as inputs, since there are only two information signals recognized by the AMPS protocol.

Other than the above-described modifications to the reference correlator 15 and decision device 16, this embodiment of the MCSE demodulator is implemented using the same components as those illustrated in FIGS. 3 through 6.

The demodulator 41 can be further varied to better suit the environment in which the FM receiver is operating. For example, in many systems, the received signal will be plagued by inter-symbol interference. This problem can be countered by expanding the possible set of reference signals generated and correlated by the MCSE demodulator for each received signal, from two reference signals to some other power of two. For example, the correlator can generate reference signals that correspond to each of the four possible two-symbol sequences under the AMPS protocol, namely 0→0, 0→1, 1→1 and 1→0, rather than generating reference signals corresponding to the two possible symbols, 1 and 0. In this way, persistent inter-symbol interference (ISI) patterns seen in 0→1 or 1→0 transitions can become part of the reference signal, and thus be factored into the demodulation process.

Another example of a possible modification of the MCSE demodulator deployed within FM receivers, would allow the demodulator to use a non-integer average number of samples per symbol. This would be especially handy in cases where the channel rate to which the receiver must conform is some non-integer multiple of the rate at which it must demodulate data symbols, as is the case with AMPS FM receivers. This could be accomplished by alternating the number of samples used per received signal, N, between the two integer numbers closest to a desired real sampling rate as illustrated in FIG. 11.

Figure 11:
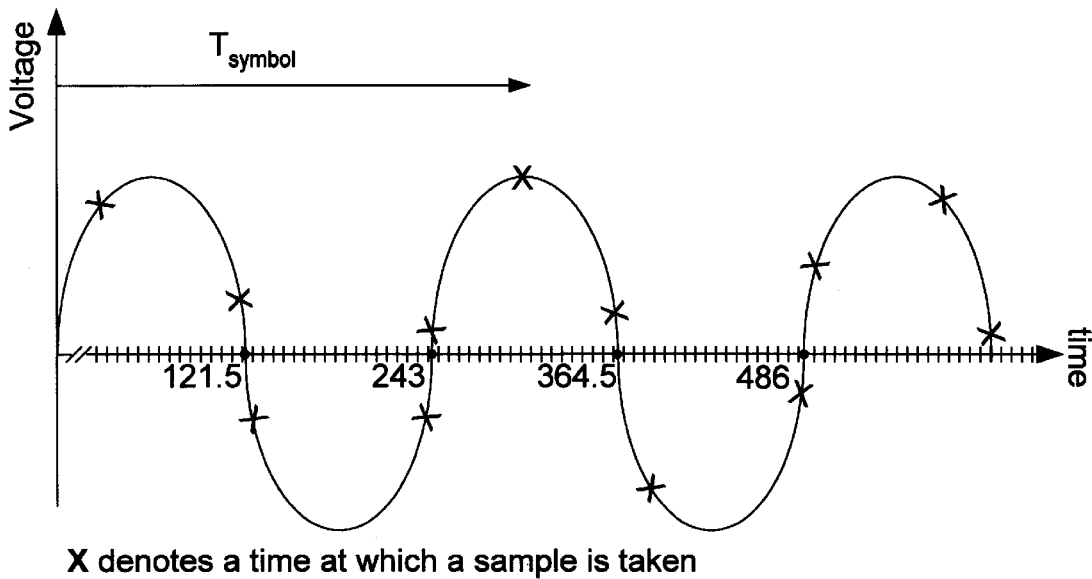

FIG. 11 illustrates how a series of consecutive received signals can be sampled a different number of times so that the average sampling rate is defined by a real number. In this illustration, it is assumed that the desired sampling rate is 10/48.6 (which is equal to 50/243), since under AMPS, the channel rate is 48.6 kbps and the rate at which symbols are modulated is 10 kbps. Such a non-integer number sampling rate is implemented by taking samples every $50/243 \times T_{symbol}$, where $T_{symbol}$ is the period required for one symbol to be received. The first symbol is thus sampled at the times 0, $50/243 \times T_{symbol}$, $100/243 \times T_{symbol}$, $150/243 \times T_{symbol}$, and $200/243 \times T_{symbol}$. The next received symbol is sampled at $7/243 \times T_{symbol}$, $57/243 \times T_{symbol}$, $107/243 \times T_{symbol}$, $157/243 \times T_{symbol}$ and $207/243 \times T_{symbol}$. The rest of the sampling intervals are shown in the table at the bottom of FIG. 10. The sampling phase thus drifts by $7/243 \times T_{symbol}$ per received symbol. By the seventh received symbol, the drift of the sampling-phase will mean that only four symbols will be taken for that received symbol. Five symbols will once again be used for the eight received symbol. The end-result is an average sampling rate of 243/50 samples per symbol, which allows the AMPS demodulator to utilize all the signal bandwidth allocated to it without having to use costly and complex interpolators.

The required implementation would involve slightly modifying the clock signal fed from the TRU 40 into the reference correlator of FIG. 10. The look-up table 42 should be modified such that the phases at which the samples of the reference signals are generated match the phases at which the received signal is sampled. This could be achieved by feeding the timing signals generated by the TRU 40 into the reference correlator 15 of FIG. 10 and the decision device 16.

It will be appreciated that numerous other modifications and variations of the above-described FM receiver are possible. For example, the novel FM receiver design described above can be applied to diversity as well as non-diversity receivers. The value of N can be varied as well.

We claim:

1. In a digital signal processor that takes as input a series of received signals, each received signal composed of firstly an information signal that is modulated according to a given digital modulation scheme by at least one symbol, and secondly an interference signal, a method of estimating the information signal by correlating the received signal with all possible reference signals, each reference signal being one of a closed set of all possible information signals recognized by the given digital modulation scheme, and selecting as an estimate of the information signal the reference signal whose correlation with the received signal most closely resembles a weighted average of correlations between previously estimated information signals and their corresponding received signals.

2. The method of claim 1 wherein the given digital modulation scheme conforms with the $\pi/4$-differential quadrature phase shift keyed (DQPSK) protocol.

3. The method of claim 1 wherein the given digital modulation scheme conforms with the Advanced Mobile Phone Service (AMPS) wideband data protocol.

4. The method of claim 1 wherein the weighted average of correlations is generated using a sliding window of correlations between previously estimated information signals and their corresponding received signals.

5. The method of claim 1 wherein the weighted average of correlations is calculated using an exponential window of correlations between previously estimated information signals and their corresponding received signals.

6. The method of claim 1 wherein the initial set of correlations between previously estimated information signals and their corresponding received signals, is generated using a training-sequence of received signals whose information signals are known.

7. A maximal correlation symbol estimation demodulator that takes as input a series of received signals, each received signal carrying an information signal that is modulated according to a given modulation scheme by one or a small integer number of symbols, and an interference signal, said demodulator comprising:

a history data correlator for generating a history data correlation, a history data correlation being a weighted average of a plurality of correlations, and each correlation being between a previously received signal and a previously made estimate of the information signal lying within the previously received signal;

a reference correlator for generating, firstly candidate correlations between the present received signal and all possible reference signals, each reference signal being one of the closed set of all possible information signals recognized by the given digital modulation scheme, and secondly decision variables that each equal the correlation between a candidate correlation and the history data correlation; and a decision device for selecting as the estimate of the information signal, the reference signal used to generate the largest of the decision variables.

8. The maximal correlation symbol estimation demodulator of claim 7 applied to serve as an equalizer.

9. The maximal correlation symbol estimation demodulator of claim 7 applied to provide an enhanced feedback signal in a conventional equalizer.

10. The maximal correlation symbol estimation demodulator of claim 7 applied to provide an enhanced feedback signal in a diversity combiner.

11. In a frequency modulated (FM) signal receiver, that takes as input a series of received FM signals, each received signal carrying firstly an information signal that is frequency modulated by one or a small integer number of symbols according to a given FM scheme, and secondly an interference signal, a method of estimating the information signal by correlating the received signal with all possible reference signals, each reference signal being one of the closed set of all possible information signals recognized by the given FM scheme.

12. The method of claim 11 wherein the step of estimating the information signal comprises the step of selecting as the estimate of the information signal, the reference signal whose correlation with the received signal most closely resembles a weighted average of correlations between previously estimated information signals and their corresponding received signals.

13. The method of claim 11 wherein the step of estimating the information signal comprises the step of selecting as an estimate of the information signal, the reference signal that correlates most closely with the received signal.

14. The method of claim 11 wherein the FM scheme applied to the received signal conforms with the Advanced Mobile Phone Service wideband data protocol.

15. The method of claim 11 wherein the step of correlating the received signals with all possible reference signals, is replaced by the step of correlating samples of received signals with samples of all possible reference signals.

16. The method of claim 15 wherein the number of samples that are used per received signal and per reference signal, is varied so that a non-integer average number of samples is used per received signal and per reference signal.

17. The method of claim 11 wherein the reference signals are replaced by reference sequences, the reference sequences being all possible sequences of some integer number of information signals recognized by the given FM scheme, and wherein the step of correlating the received signal with all possible reference signals is replaced by the step of correlating sequences of that integer number of received signals with all possible reference sequences.

18. A frequency modulated (FM) signal receiver, comprising a timing recovery unit (TRU), a correlation demodulator that outputs symbols used to modulate the FM radio-wave, and at least one branch of components that feeds the TRU and the correlation demodulator, each branch being comprised of an antenna for detecting FM radio-waves, connected to a radio-frequency (R/F) front end, connected to an automatic gain controller (AGC), connected to an analogue-to-digital (A/D) converter, connected to a receive (Rx) filter, wherein the correlation demodulator is a maximal correlation symbol estimation demodulator that takes as input a series of frequency modulated (FM) received signals, each received signal carrying an information signal that is modulated according to a given FM scheme by one or a small integer number of symbols and an interference signal, said demodulator comprising:

a history data correlator for generating a history data correlation, a history data correlation being a weighted average of a plurality of correlations, and each correlation being between a previously received signal and a previously made estimate of the information signal lying within the previously received signal;

a reference correlator for generating, firstly candidate correlations between the present received signal and all possible reference signals, each reference signal being one of the closed set of all possible information signals recognized by the given FM scheme, and secondly decision variables that each equal the correlation between a candidate correlation and the history data correlation; and a decision device for selecting as the estimate of the information signal, the reference signal used to generate the largest of the decision variables.

19. The FM signal receiver of claim 18 wherein a plurality of branches are used, wherein the antennae are separated physically from each other by a small distance and/or tuned to receive signals at a slightly different frequency from each other, wherein a diversity combiner for combining the outputs of each branch is interposed between the branches on one hand and the correlation demodulator and TRU on the other hand, and wherein the correlation demodulator sends its output as feedback into the diversity combiner.

20. A maximal correlation symbol estimation demodulator that takes as input a series of frequency modulated (FM) received signals, each received signal carrying an information signal that is modulated according to a given FM scheme by one or a small integer number of symbols and an interference signal, said demodulator comprising:

a history data correlator for generating a history data correlation, a history data correlation being a weighted average of a plurality of correlations, and each correlation being between a previously received signal and a previously made estimate of the information signal lying within the previously received signal;

a reference correlator for generating, firstly candidate correlations between the present received signal and all possible reference signals, each reference signal being one of the closed set of all possible information signals recognized by the given FM scheme, and secondly decision variables that each equal the correlation between a candidate correlation and the history data correlation; and a decision device for selecting as the estimate of the information signal, the reference signal used to generate the largest of the decision variables.

* * * * *